(No Model.)

F. M. WILSON.
FRUIT PICKING SHEARS.

No. 532,513.  Patented Jan. 15, 1895.

WITNESSES:  
Geo. W. F. McElhone.  
Lewis B. Dawley.

INVENTOR  
Franklin M. Wilson,  
BY James F. Pettit,  
ATTORNEY

United States Patent Office.

FRANKLIN M. WILSON, OF BINGHAMTON, NEW YORK.

FRUIT-PICKING SHEARS.

SPECIFICATION forming part of Letters Patent No. 532,513, dated January 15, 1895.

Application filed April 25, 1894. Serial No. 508,922. (No model.)

*To all whom it may concern:*

Be it known that I, FRANKLIN M. WILSON, a citizen of the United States, residing in the city of Binghamton, in the county of Broome and State of New York, have invented certain new and useful Improvements in Fruit-Picking Shears; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is an improvement in fruit picking shears, and consists in the details of construction hereinafter fully described and particularly pointed out in the claim.

The object of the invention is to provide for the gathering of the fruit readily by the use of one hand only and in such a manner as not to bruise or break the branches of the tree.

Figure 1:
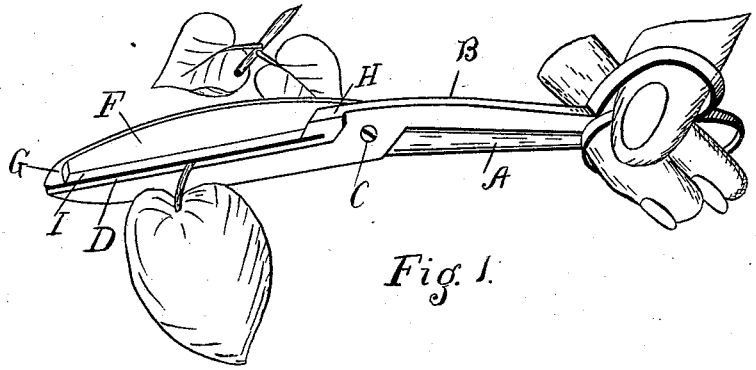
Figure 2:
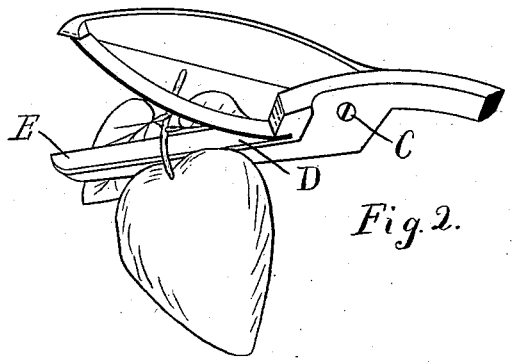

In the accompanying drawings—Figure 1 is a perspective view of my invention with the shears closed. Fig. 2 is a partial view of the front part of the shears opened.

The improved shears consist of handles A and B pivoted together as usual at C and terminated in the usual handles. The cutting extensions F consist of a lower part D having a broad bearing surface E terminating in a knife edge on one side. The upper part F has a cutting edge adapted to form a shear cut with the edge of the part E but in order to hold the fruit while cutting I provide a spring plate I having one end seated in a slot in the projection or stud H while the outer end of said spring is curved upward and is in the path of a projection G on the end of the upper blade extending out laterally and a little above the edge so as to permit the edges to act upon the branch or twig to sever the same. The spring plate I is arranged directly above the bearing E and when the shears are closed the twig is held between the parts I and E while the shears are cutting as in Fig. 1, while when open the parts assume the position shown in Fig. 2.

It will be noticed that the broad bearing surface provides a blade right angular in cross section.

Having thus described my invention, what I claim, and desire to secure by Letters Patent, is—

A fruit cutter consisting of a pair of shears having a lower bearing surface, an upper cutter, and a spring plate one end of which is supported by the lower part and the other end by the upper part, substantially as described In testimony whereof I affix my signature in presence of two witnesses.

FRANKLIN M. WILSON. [L. S.]

Witnesses:
CHARLES H. FREAR,
JEREMIAH ROBBINS.